United States Patent [19]

Cuperus

[11] Patent Number: 5,693,351
[45] Date of Patent: Dec. 2, 1997

[54] PROCESS FOR PREPARING A FILLED PASTA PRODUCT

[75] Inventor: Herman Jacob Cuperus, Kuesnacht, Switzerland

[73] Assignee: Nestec S.A., Vevey, Switzerland

[21] Appl. No.: 360,172

[22] Filed: Dec. 20, 1994

Related U.S. Application Data

[63] Continuation of Ser. No. 631,658, Dec. 21, 1990, abandoned.

[30] Foreign Application Priority Data

Feb. 2, 1990 [CH] Switzerland ............... 00346/90

[51] Int. Cl.$^6$ ........................................ A21D 13/00
[52] U.S. Cl. ............... 426/94; 426/92; 426/275; 426/283; 426/451; 426/514; 426/557
[58] Field of Search ............... 426/275, 94, 92, 426/514, 283, 128, 557, 451

[56] References Cited

U.S. PATENT DOCUMENTS

| | | | |
|---|---|---|---|
| 2,950,978 | 8/1960 | Milani | 426/275 |
| 4,874,619 | 10/1989 | Leonardo et al. | 426/94 |
| 4,898,744 | 2/1990 | Liggett et al. | |
| 5,009,867 | 4/1991 | Kratochvil | 426/120 |

FOREIGN PATENT DOCUMENTS

| | | |
|---|---|---|
| 1176585 | 4/1959 | France . |
| 8609454 U | 10/1986 | Germany . |

OTHER PUBLICATIONS

Marilyn Bakker "The Wiley Encyclopedia of Packaging Technology" 1986 p. 365.

*Primary Examiner*—Donald E. Czaja
*Assistant Examiner*—Lien Tran
*Attorney, Agent, or Firm*—Vogt & O'Donnell, LLP

[57] ABSTRACT

At least one opening is formed in the periphery of a sealed filled pasta product in sealed edges of two superposed leaves of pasta having a filling material between the leaves to form a filled pasta product having at least one formed opening in its periphery. The filled pasta product may be dried or may be blanched and dried.

18 Claims, No Drawings

PROCESS FOR PREPARING A FILLED PASTA PRODUCT

CROSS REFERENCE TO RELATED APPLICATION

This application is a continuation application of Ser. No. 07/631,658, filed Dec. 21, 1990, now abandoned.

BACKGROUND OF THE INVENTION

This invention relates to a process for the production of filled pastas, for example of the ravioli or tortellini type, in dried form and to a filled and dried pasta obtained by this process.

One known process for preparing dried filled pastas, which is described in JP 78-127 843, comprises applying an aqueous emulsion of an edible oil to the interior of a pasta envelope, introducing a dehydrated filling therein, sealing the envelope around its periphery and drying the envelope thus sealed.

Another process, which is described in U.S. Pat. No. 2,950,978, comprises forming a pasta envelope resistant to drying by addition of a crack-preventive additive herein referred to as an "anti-crackling" agent, such as a sugar or glycerol, introducing a dehydrated filling therein, sealing the envelope around its periphery, piercing the centre of the envelope and then drying the envelope. However, this process has the disadvantage that it involves the use of an additive to avoid crackling around the perforations during drying.

SUMMARY OF THE INVENTION

The object of the present invention is to obviate the disadvantages of the prior art and to provide a process for the preparation of dried filled pastas which does not involve the use of anti-crackling agent additives and which facilitates drying and/or reconstitution of the product.

To this end, the process according to the invention, in which a pasta envelope is prepared from two superposed leaves of pasta or from one leaf of pasta folded double, after which a filling is introduced and the envelope is sealed around its periphery by crimping of the edges of the superposed leaves or the folded leaf and the filled pasta obtained is dried, is characterized in that at least one opening is provided in the sealed periphery of the envelope.

According to the invention, therefore, at least one opening is provided in the sealed periphery of the envelope.

The superposed leaves, i.e., two separate leaves or one leaf folded double, may be sealed around the filling material by crimping the leaves, and the openings may be formed by any suitable means.

The opening or openings may be provided in any part of the periphery of the pasta envelope. For example, the opening or openings may be provided in one of the sides of the envelope, preferably in the middle of one side, or at one of its corners. For example, for a filled pasta of the ravioli type, an opening may be provided in the middle of one side of a rectangular envelope and another two openings may be provided at the corners formed by that side and the two sides perpendicular thereto.

The opening or openings can facilitate drying of the filled pasta by allowing water vapour to escape from the envelope and, optionally, the filling. The opening or openings can also facilitate rehydration of the filled pasta by allowing a liquid to enter the envelope and the filling more rapidly.

In a first embodiment of the process according to the invention, a needle is introduced between the edges of the superposed leaves or the folded leaf before the edges are crimped and the needle is withdrawn after crimping.

In a second embodiment, the envelope is sealed around its periphery by crimping of the edges, at least one segment of the edges being left uncrimped.

In a third embodiment, the first two embodiments are combined.

One advantage of the process according to the invention is that it provides for rapid drying of the filled pastas and rapid and easy reconstitution of the pastas.

Another advantage of the process according to the invention is that the dried filled pastas obtained are capable of keeping perfectly for long periods. Another advantage is that the process according to the invention can be carried out simply and economically.

By virtue of the process according to the invention, it is possible to obtain dried filled pastas in various shapes and sizes which, organoleptically, are comparable with traditional filled pastas but which can be rapidly reconstituted for consumption, for example by pouring on a hot liquid, such as a stock or a sauce at 70° to 90° C. or boiling water, and leaving the whole standing for a brief period of the order of 3 to 5 minutes or even by immersion in a cold liquid and rapid cooking in a microwave oven for 2 to 6 minutes.

The process according to the invention also enables a complete meal, for example of filled pasta, sauce and vegetables, to be prepared in dehydrated form.

The process according to the invention for the preparation of filled and dried pastas may be carried out discontinuously, semicontinuously or, preferably, continuously.

The present invention also includes a filled pasta product characterized in that two superposed pasta leaves which contain a filling therebetween have edges sealed together about a periphery of the leaves and have at least one formed opening positioned in the sealed edges.

DETAILED DESCRIPTION OF THE INVENTION

The process according to the invention is carried out by initially preparing raw pasta. This may be done by preparing a mix comprising a ground cereal product and water. It is possible, for example, to use flour and/or semolina obtained by grinding grains of cereals, such as hard wheat, soft wheat, rice, corn. Additives, such as fresh, frozen or dehydrated eggs, salt, spices, seasoning, emulsifiers and/or natural coloring matter, such as tomato or spinach, may be added to the ground product. Water may also be added in a quantity sufficient to obtain a mix having a dry matter content of the order of 65 to 70% by weight. The mixture may be kneaded, for example for 10 to 40 minutes, to give it a pasty homogeneous texture.

A parent sheet of pasta may then be formed, for example by extrusion and/or rolling. This may be done in particular by forming a strand of pasta by extrusion and then rolling the strand between several successive pairs of rollers until a parent sheet having the desired thickness is obtained. This parent sheet may then be cut into leaves of predetermined shape for preparing the pasta envelopes mentioned. For example, the parent sheet may be cut into rectangular leaves, for example 20 to 40 mm wide and 40 to 80 mm long, and pasta envelopes in the shape of squares having an edge length of 20 to 40 mm may then be formed by folding. The parent sheet may also be cut up into circular leaves, for example 20 to 40 mm in diameter, and pasta envelopes in the shape of crescents 20 to 40 mm in diameter may then be formed by folding. It is even possible, for example, to cut the parent sheet into strips, for example having an edge length of 20 to 40 mm, which may then be superposed in pairs and cut into superposed square leaves.

A filling is introduced into each pasta envelope. The filling may consist, for example, of hashed meat, vegetables, fish, seafood, cheese.

The filling may be introduced fresh or may have been partly dehydrated beforehand, for example to a dry matter content of 75 to 80% by weight. The filling may also have been cooked beforehand. The filling may be introduced into the envelope by any suitable means, for example by means of a plunger. For example, the filling may be introduced in a quantity of 0.2 to 0.8 grams fresh filling per envelope, depending on the size and shape of the envelope.

The pasta envelope may then be sealed around its periphery by crimping of the edges of the superposed leaves or the folded leaf, for example using a mould or a suitable press and at least one formed opening is provided in the sealed periphery of the envelope.

The filled pastas obtained may be blanched, for example for 2 to 3 minutes in boiling water or steam.

The blanched pastas obtained may then be slightly cooled to a temperature of the order of 80° to 85° C. The pastas may then be dried, for example in a dryer for 4 to 8 hours at 80° to 82° C., to a dry matter content of 95 to 97% by weight and a water activity of 0.2 to 0.3.

In a first embodiment of the process according to the invention, a needle may be introduced into the pasta envelope before the periphery of the envelope is sealed. The needle may be introduced before or after the filling and, preferably, at the same time. The needle is positioned between the edges of the superposed leaves or the folded leaf and can prevent them from touching—at the place where it is situated on the periphery of the envelope—during sealing by crimping. The result of this is that the pasta envelope is not uniformly sealed around its periphery and has a place where the two edges are not joined together. When the needle is withdrawn from the envelope after sealing, an opening is obtained at the place where the needle was positioned during sealing. The needle may preferably be positioned in the middle of one of the sides of the envelope. It is also possible to arrange several needles on one side or distributed—uniformly or otherwise—over several sides of the pasta envelope.

In a second embodiment of the process according to the invention, the envelope is sealed by crimping of the edges, at least one segment of the edges being left uncrimped. This variant may be carried out using a mould or suitable press modified in such a way that a crimping effect is not exerted over the entire length of the edges to be sealed, instead at least one segment of these edges is not crimped. If the mould comprises, for example, relief elements corresponding to the periphery of the envelope, corresponding elements crimping the envelope by approaching one another on either side of its periphery, recesses may be provided along those elements.

Thus, when the envelope is sealed around its periphery, the two edges of the envelope situated beneath a recess are not brought into contact with one another. This leaves a segment where the two edges are not joined to one another, so that an opening is formed in the sealed periphery of the envelope. The relief elements of the mould may thus comprise one or more recesses which may be distributed uniformly or otherwise, depending on the shape of the envelope. If the envelope is square, the relief elements of the mould may comprise, for example, two recesses situated in two successive corners.

In this way, it is possible to prepare a filled and dried pasta having at least one opening in the sealed periphery of its envelope.

For example, it is possible to prepare a dried filled pasta having at least one opening situated in the middle of one of the sides of the envelope and/or in one of the corners of the envelope.

EXAMPLES

The process and the product according to the invention are illustrated by the following Examples in which parts and percentages are by weight.

Example 1

80 parts hard wheat flour, 12 parts whole egg, 2 parts emulsifier, 1.5 parts salt, 1.5 parts egg white, 2 parts gluten and water are mixed to form a mix having a dry matter content of 68%.

The mix is kneaded for 30 minutes, after which a strand of pasta is formed by extrusion. The strand is rolled successively between four pairs of rollers respectively calibrated from the first to the fourth to 4.5 mm, 1.3 mm, 1.0 mm and 0.8 mm. A parent sheet of pasta having a thickness of approximately 0.8 mm is obtained.

The parent sheet is cut into rectangular leaves 30 mm wide and 60 mm long, after which a square pasta envelope having an edge length of 30 mm is formed by folding.

0.4 g of a filling consisting of fresh hashed meat is introduced into the envelope. At the same time, a needle is introduced into one of the sides of the pasta envelope in the plane thereof and perpendicularly to the side.

The envelope is then sealed along its periphery by crimping of its edges using a mould. The pastas thus obtained are blanched for 2 minutes in boiling water at 95°–100° C. and are then dried in a dryer for about 6 hours at 80° C. to a dry matter content of 95 to 97% by weight.

Dried filled pastas having an opening in the sealed periphery of the envelope in the middle of one of the sides of the envelope are thus obtained.

For reconstitution, the dried filled pastas are placed in a bowl, the equivalent quantity by weight of boiling water is poured in and the whole is left standing for 5 minutes. Reconstituted filled pastas comparable with traditional filled pastas are obtained.

Example 2

A 0.8 mm thick parent sheet of pasta is prepared in the same way as in Example 1. This sheet is then cut into 30 mm long strips which are superposed in pairs and then cut to form square pasta envelopes having an edge length of 30 mm.

0.4 g of a filling of fresh hashed meat is introduced into the envelope.

The envelope is sealed around its periphery by crimping of its edges using a mould comprising relief elements corresponding to the periphery of the envelope, these elements comprising two recesses situated in two successive corners of one of the sides so that these two successive corners are left uncrimped. The pastas obtained are blanched in boiling water for 2 to 3 minutes and are then dried in a dryer for about 3 hours at 80° C. to a dry matter content of 95 to 97% by weight.

Dried filled pastas having two openings situated in the sealed periphery of the envelope in two successive corners are thus obtained.

For reconstitution, the dried filled pastas are placed in a bowl, cold water is poured on in a quantity of approximately 100 ml water per 10 g pasta and the bowl is placed in a microwave oven for 2 minutes.

Reconstituted filled pastas comparable with traditional filled pastas are obtained.

Example 3

The dried fresh pastas prepared in accordance with Example 1 or 2 are mixed with a dehydrated sauce to obtain a complete meal after reconstitution. To this end, 50 g dried filled pastas and 75 g dehydrated sauce having the following composition (in % by weight dry matter):

| | |
|---|---|
| tomato powder | 53.1 |
| sugar | 14.2 |
| salt | 6.4 |
| sodium glutamate | 3.5 |
| thickener | 9.7 |
| modified starch | 6.4 |
| fats | 3.6 |
| onion powder | 1.6 |
| garlic powder | 0.5 |
| pepper | 0.1 |
| laurel, oreganum, parsley | 0.9 | are placed in a container. 450 to 500 ml boiling water are then added to the pasta/sauce mixture, the whole is left standing for 5 minutes and a reconstituted meal comparable with a traditional dish of filled pasta in tomato sauce is obtained.

What is claimed is:

1. A process for preparing a dried pasta product containing a filling comprising:
   superposing two leaves of pasta, wherein the leaves do not contain an opening therein and do not contain an anti-crackling agent, so that edges of the two leaves are superposed and so that the superposed leaves and edges form a pasta envelope for containing a filling;
   introducing a filling into the pasta envelope to obtain a pasta envelope containing the filling;
   crimping the edges of the pasta envelope containing the filling so that at least one segment of the edges defines an opening between the edges and so that a remainder of the edges of the two leaves are crimped and sealed together to form a sealed pasta which contains at least one segment opening but which does not contain an opening within the leaves;
   blanching the sealed pasta without an opening within the leaves to obtain a blanched pasta; and
   drying the blanched pasta without an opening within the leaves to obtain a dried pasta product containing a filing.

2. A process for preparing a dried pasta product containing a filling comprising:
   folding an individual leaf of pasta, wherein the leaf does not contain an opening and does not contain an anti-crackling agent, onto itself so that edges of the folded leaf extend from a fold and are superposed and so that the folded leaf forms a pasta envelope for containing a filling;
   introducing a filling into the pasta envelope to obtain a pasta envelope containing the filling;
   crimping the edges of the pasta envelope containing the filling so that at least one segment of the edges defines an opening between the edges and so that a remainder of the edges are crimped and sealed together to form a sealed pasta which contains at least one segment opening but which does not contain an opening within the folded leaf;
   blanching the sealed pasta without an opening within the folded leaf to obtain a blanched pasta; and
   drying the blanched pasta without an opening within the folded leaf to obtain a dried pasta product containing a filling.

3. A process according to claim 1 or 2 further comprising positioning a needle between the edges so that during crimping, the opening is formed about the needle.

4. A process according to claim 1 or 2 wherein the filling is a fresh filling.

5. A process according to claim 1 or 2 wherein the filling is a partially dehydrated filling.

6. A process according to claim 5 wherein the partially dehydrated filling has a dry matter content of 75% to 80% by weight.

7. A process according to claim 1 or 2 wherein from 0.2 g to 0.8 g of filling is introduced into the pasta envelope.

8. A process according to claim 1 or 2 wherein the sealed pasta is blanched in boiling water.

9. A process according to claim 1 or 2 wherein the sealed pasta is blanched in steam.

10. A process according to claim 1 or 2 wherein the sealed pasta is blanched for from 2 minutes to 3 minutes.

11. A process according to claim 8 wherein the sealed pasta is blanched for from 2 minutes to 3 minutes.

12. A process according to claim 9 wherein the sealed pasta is blanched for from 2 minutes to 3 minutes.

13. A process according to claim 2 wherein the leaf is rectangular and is folded and the edges are crimped so that two opposing segments define openings at opposing corner segments adjacent the fold.

14. A process according to claim 13 wherein the edges are crimped so that a segment which opposes the fold defines an opening.

15. A process according to claim 1 or 2 wherein the envelope is formed so that the superposed edges define a polygonal shape comprising a plurality of sides and corner segments and wherein the edges are crimped so that there is an opening at one corner segment and so that there is a side segment opening.

16. A process according to claim 1 or 2 wherein the envelope is formed so that the superposed edges define a polygonal shape comprising a plurality of sides and corner segments and wherein the edges are crimped so that there are openings at each of two successive corner segments and so that there is a side segment opening.

17. A process according to claim 16 wherein the edges are crimped so that the side segment opening is between the two successive corner segment openings.

18. A process according to claim 16 wherein the superposed edges define four sides and four corner segments and wherein the envelope is crimped so that the side segment opening opposes the side between the two successive corner segments.

* * * * *